(12) United States Patent
Sonnenrein et al.

(10) Patent No.: US 7,096,101 B2
(45) Date of Patent: Aug. 22, 2006

(54) METHOD FOR CARRYING OUT A TELEDIAGNOSIS ON A MOTOR VEHICLE, VEHICLE DIAGNOSIS MODULE AND SERVICE CENTER

(75) Inventors: Thomas Sonnenrein, Bockenem (DE); Michael Laedke, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/432,150

(22) PCT Filed: Jul. 12, 2002

(86) PCT No.: PCT/DE02/02553

§ 371 (c)(1),
(2), (4) Date: Oct. 8, 2003

(87) PCT Pub. No.: WO03/027629

PCT Pub. Date: Apr. 3, 2003

(65) Prior Publication Data

US 2004/0112124 A1    Jun. 17, 2004

(30) Foreign Application Priority Data

Sep. 18, 2001    (DE) ................................ 101 45 906

(51) Int. Cl.
*G06F 7/00*    (2006.01)
(52) U.S. Cl. ............................ 701/29; 701/33; 701/36; 702/183; 714/25
(58) Field of Classification Search ............ 701/29–36; 340/425.5, 426.13, 426.14, 426.16; 702/182, 702/183; 714/25, 26, 31
See application file for complete search history.

(56) References Cited

U.S. PATENT DOCUMENTS

| | | | |
|---|---|---|---|
| 5,442,553 A | | 8/1995 | Parrillo |
| 6,028,537 A | * | 2/2000 | Suman et al. ............... 340/988 |
| 6,169,943 B1 | | 1/2001 | Simon et al. |
| 6,181,994 B1 | | 1/2001 | Colson et al. |
| 6,285,931 B1 | | 9/2001 | Hattori et al. |
| 6,535,112 B1 | * | 3/2003 | Rothschink ............... 340/425.5 |
| 6,594,579 B1 | * | 7/2003 | Lowrey et al. ............. 701/123 |

FOREIGN PATENT DOCUMENTS

| | | |
|---|---|---|
| DE | 195 22 937 | 1/1996 |
| DE | 44 46 512 | 6/1996 |
| DE | 198 53 000 | 6/1999 |
| DE | 198 32 498 | 2/2000 |
| DE | 199 21 846 | 11/2000 |
| DE | 199 33 334 | 1/2001 |
| DE | 100 38 764 | 2/2002 |
| EP | 0 685 723 | 12/1995 |
| EP | 0 754 940 | 1/1997 |
| EP | 0 982 697 | 3/2000 |
| EP | 1 069 535 | 1/2001 |
| EP | 1 087 343 | 3/2001 |

* cited by examiner

*Primary Examiner*—Yonel Beaulieu
(74) *Attorney, Agent, or Firm*—Kenyon & Kenyon LLP

(57) ABSTRACT

A method for carrying out a remote diagnosis in a motor vehicle is provided, including initializing the remote diagnosis, determining diagnostic data in the vehicle as a function of diagnostic mechanisms and/or diagnostic parameters available in the vehicle at the time of the diagnostic data determination, and transferring at least portions of the diagnostic data to an external service center which is designed to evaluate the transmitted diagnostic data. The diagnostic mechanisms and/or diagnostic parameters may be at least in part transferred from the service center to the vehicle upon execution of initialization.

17 Claims, 2 Drawing Sheets

METHOD FOR CARRYING OUT A TELEDIAGNOSIS ON A MOTOR VEHICLE, VEHICLE DIAGNOSIS MODULE AND SERVICE CENTER

FIELD OF THE INVENTION

The present invention relates to a method for carrying out a remote diagnosis in a motor vehicle in which a remote diagnosis is initialized, diagnostic data in the vehicle is determined as a function of diagnostic mechanisms and/or diagnostic parameters available in the vehicle at the time of the diagnostic data determination, and at least portions of the diagnostic data are transferred to an external service center which is designed to evaluate the transmitted diagnostic data. The present invention further relates to a vehicle diagnostic module for implementing the method according to the present invention. The present invention also relates to a service center, in particular for use in the method according to the present invention, which is designed to evaluate diagnostic data transferred from a vehicle via a radio connection.

BACKGROUND INFORMATION

The trend toward networking, for example, of closed- and/or open-loop control devices in modern motor vehicles is making possible increasingly capable diagnostic methods with which, for example, fault states in the motor vehicle can be detected. Electronic motor vehicle diagnostic systems are used in modern service facilities to allow unequivocal fault diagnosis by service technicians, especially including service technicians who do not have detailed knowledge of the logical and physical networking of the individual components in the particular motor vehicle. A large number of manufacturer-specific motor vehicle diagnostic systems exist. There are also manufacturer-independent motor vehicle diagnostic systems that have a very wide variety of mechanisms for fault diagnosis for a broad range of motor vehicles. For that purpose, vehicle- or manufacturer-specific diagnostic mechanisms and/or diagnostic parameters are stored in the motor vehicle diagnostic systems. In addition, the known motor vehicle diagnostic systems have a user interface that is generally embodied in the form of a screen and a keyboard. The current motor vehicle diagnostic systems are moreover equipped with different motor vehicle adapters so that a suitable connection can be made to the motor vehicle. If this connection is a cable-based connection, the corresponding motor vehicle must be located in the physical vicinity of the motor vehicle diagnostic system.

German Patent No. 44 46 512 discloses an apparatus for carrying out vehicle tests in which the terminal of the motor-vehicle-side diagnostic/test connector is connected to a motor vehicle diagnostic system present in the service facility not via a cable but rather via a telephone located in the motor vehicle itself, so that transfer of the diagnostic data can be performed via the mobile radio network.

German Published Patent Application No. 199 21 846 discloses an external portable test unit that is equipped with a modem and is connected to a mobile telephone so that faults can be diagnosed and malfunctions remedied outside permanent service facilities via corresponding mobile radio connections.

In the disclosed systems, the diagnostic mechanisms and/or diagnostic parameters that are employed to determine diagnostic data are stored permanently in the vehicle and/or in the service center or the vehicle diagnostic system. Expansion of the diagnostic mechanisms and/or diagnostic parameters, which is necessary, e.g., when new vehicle components are utilized, is therefore laborious.

SUMMARY OF THE INVENTION

In the method according to an embodiment of the present invention builds the diagnostic mechanisms and/or diagnostic parameters are at least in part transferred from the service center to the vehicle upon execution of a remote diagnosis.

Because all the diagnostic mechanisms and/or diagnostic parameters used for the individual vehicle model are not transferred from the service center to the motor vehicle until the beginning of the remote diagnosis, the diagnostic data in the vehicle can always be determined on the basis of up-to-date diagnostic mechanisms and/or diagnostic parameters. With the method according to the present invention it is no longer necessary to bring the vehicle into a specialized service facility for a software update when the diagnostic mechanisms and/or diagnostic parameters need to be modified. The same applies when the vehicle is equipped with new components, for example with new control units. In addition, permanent and therefore memory-intensive storage of the diagnostic mechanisms and/or diagnostic parameters in the vehicle can be eliminated. The method according to the present invention makes it possible, for example, to integrate model-independent diagnostic modules into a very wide variety of vehicles and terminals, so that higher part quantities can be achieved and the remote diagnostic method can be standardized. Because local prediagnosis and local data acquisition and preprocessing in the vehicle are decoupled from evaluation of the diagnostic data in the service center, the method according to the present invention can be used independently of the particular data transfer method and data transfer speed. Some of the diagnostic mechanisms and/or diagnostic parameters can, if applicable, already be stored in the vehicle in model-dependent fashion during vehicle production or during production of the vehicle diagnostic module.

Diagnostic data in the vehicle may determined as a function of diagnostic mechanisms and/or diagnostic parameters available in the vehicle at the time of the diagnostic data determination by the interaction of a diagnostic module with a closed- and/or open-loop control device. The diagnostic module can be, in particular, a universal diagnostic module that can be installed in a very wide variety of motor vehicle models, optionally even at a later time. Because the diagnostic mechanisms and/or diagnostic parameters suitable in each case are transferred for purposes of remote diagnosis from the service center to the diagnostic module, for example via a mobile radio interface associated with the motor vehicle or the diagnostic module, the diagnostic module can be adapted to the closed- and/or open-loop control device provided in the particular motor vehicle.

According to an example embodiment, a remote diagnosis includes transferring vehicle identification data from the vehicle to the service center used in the service center for the determination of suitable diagnostic mechanisms and/or suitable diagnostic parameters.

In addition, the determination processes may be performed after a diagnostic command has been transferred from the service center to the vehicle. In this way, for example, time-critical diagnostic operations can be externally configured and controlled or initiated, for example, when all the necessary diagnostic mechanisms and/or diagnostic parameters have been successfully transferred to the vehicle or to the diagnostic module.

According to another embodiment, the data transfer between the vehicle and the service center may be accomplished via a radio connection, in particular via a mobile radio connection. Because local prediagnosis in the vehicle is decoupled from evaluation of the diagnostic data, which optionally can encompass operating data, in the service center, the method according to the present invention can be carried out independently of the specific transfer method and transfer speed. For example, the data transfer can be accomplished via GSM-SMS, the GSM data channel, WAP, or GPRS. Other mobile radio standards, for example UMTS, are of course also conceivable. If applicable, the data transferred via the radio connection to the vehicle may be appropriately converted before they are forwarded, for example, to a vehicle bus or a vehicle network.

In certain embodiments of the method according to the present invention, it may be advantageous for the determination and transferring processes to be performed repeatedly, depending on diagnostic mechanisms and/or diagnostic parameters transferred again from the external service center. For example, in order to isolate a fault, it may be advantageous if, after the evaluation of diagnostic data is transferred from the vehicle to the service center, further diagnostic mechanisms and/or diagnostic parameters are transferred, as a function of the result of the evaluation, to the vehicle or to the diagnostic module.

The vehicle diagnostic module according to the present invention provides an interface for receiving the diagnostic mechanisms and/or diagnostic parameters, upon initialization of the remote diagnosis, at least in part from the external service center. It is thereby possible, in particular, to use vehicle diagnostic modules of uniform design for different motor vehicle models. The vehicle diagnostic module can be constituted, for example, by separate hardware and software, or it can be entirely or partly integrated into other components, for example into telematics terminals such as driver information systems and car radios, or into gateways, multimedia devices, etc. Reference is additionally made to the corresponding embodiments in connection with the method according to the present invention.

In an example embodiment of the vehicle diagnostic module according to the present invention, diagnostic data may be determined in conjunction with a closed- and/or open-loop control device. Because the diagnostic mechanisms and/or diagnostic parameters suitable for the particular vehicle model are downloaded, the vehicle diagnostic module is adapted to the particular closed- and/or open-loop control devices (and/or other vehicle components) present in the vehicle only upon initialization of the remote diagnosis, and can then cooperate with them in order to perform the respective diagnosis.

In the vehicle diagnostic module according to the present invention provision is also made for it to authorize the transfer of vehicle identification data to the service center upon initialization of the remote diagnosis, the vehicle identification data being provided for utilization in the service center in order to determine suitable diagnostic mechanisms and/or suitable diagnostic parameters.

In another embodiment of the vehicle diagnostic module according to the present invention the initial determination of the diagnostic data may be made after a diagnostic command has been transferred from the service center to the vehicle. As a result, for example, time-critical diagnostic operations can be externally configured and controlled or initiated, which may be the case when all the necessary diagnostic mechanisms and/or diagnostic parameters have been successfully transferred to the vehicle or to the diagnostic module.

Provision may also be made for the interface to be designed for connection of a radio device, in particular a mobile radio device. The radio device need not, in this context, be connected directly to the vehicle diagnostic module. In many cases it is advantageous if the radio device is connected via a bus system present in any case in the vehicle, for example via a CAN bus system. Especially when a bus system is used, the interface of the vehicle diagnostic module can be used not only for connecting the radio device but also, for example, to link the vehicle diagnostic module to a closed- and/or open-loop control device, or other components, present in the vehicle.

Another embodiment of the vehicle diagnostic module according to the present invention includes volatile memory means for storing diagnostic mechanisms and/or diagnostic parameters transferred from the external service center. Since the diagnostic mechanisms and/or diagnostic parameters are, according to the present invention, transferred from the service center to the motor vehicle upon initialization of the remote diagnosis, this data does not need to be stored permanently in the motor vehicle, so that a more-economical volatile memory is sufficient for temporary storage of the respective diagnostic mechanisms and/or diagnostic parameters.

The service center according to the present invention may include means which are designed for determining, on the basis of vehicle identification data transmitted from the vehicle, suitable diagnostic mechanisms and/or suitable diagnostic parameters and for transmitting them via a radio connection to the vehicle, the diagnostic mechanisms and/or diagnostic parameters being provided for utilization in the vehicle for determination of the diagnostic data. The service center can be realized using hardware and software known in the art, for example, commercially available PCs that are equipped with a corresponding database and are connected to a mobile radio network. It is additionally possible for the procedures in the service center to be controlled as a function of the particular vehicle model and/or the particular user.

In the context of the service center according to the present invention, the radio connection may be a mobile radio connection. It is also possible, of course, for at least portions of the data transfer path to the motor vehicle to be provided by wire-based connections.

The service center may be a mobile service center. In this case it can, for example, be located and/or used in a breakdown assistance vehicle or the like.

DETAILED DESCRIPTION

Figure 1:
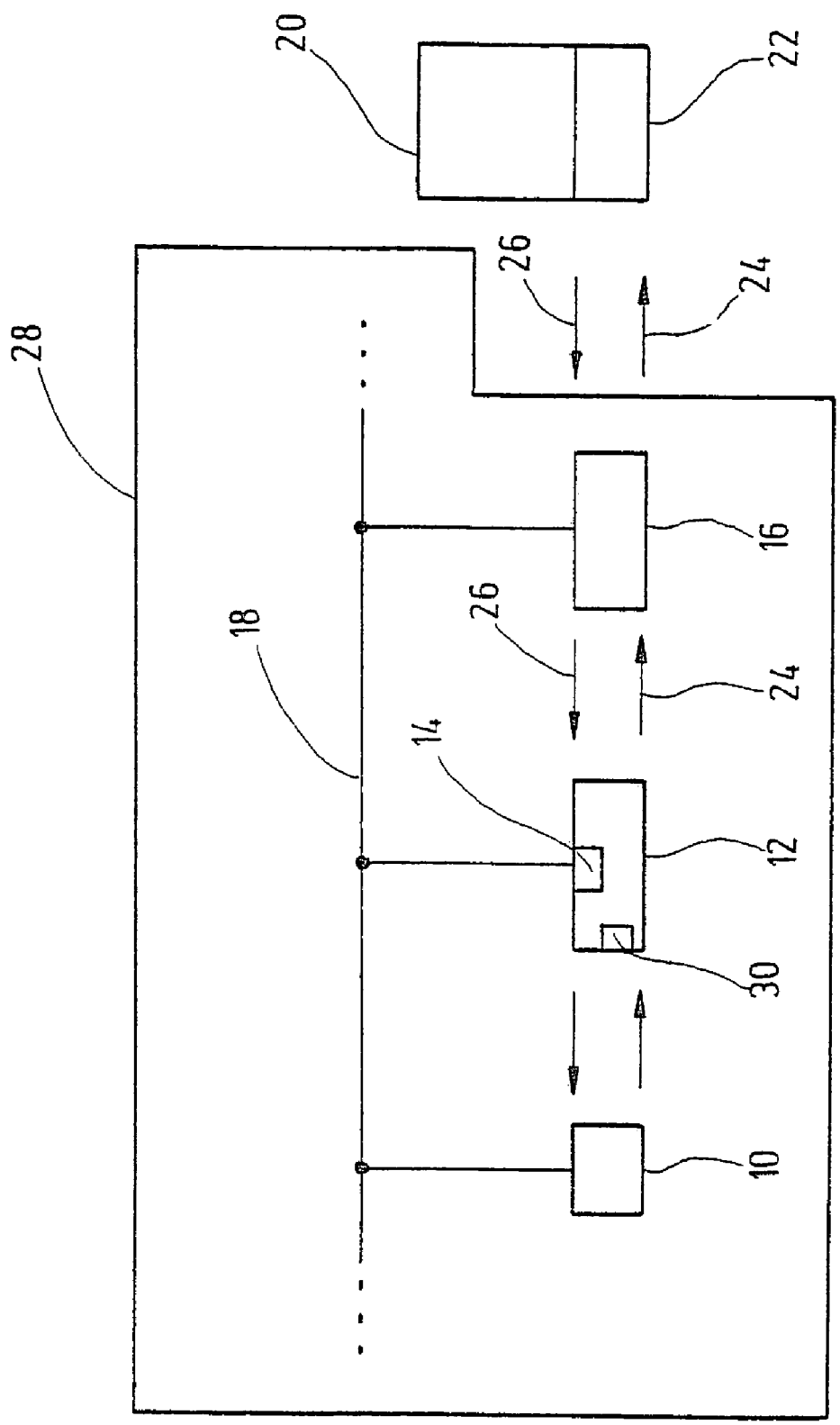
FIG. 1 is a block diagram illustrating the interaction of the vehicle diagnostic module with a service center in accordance with the method according to the present invention.

FIG. 1 is a block diagram illustrating the interaction of an embodiment of the vehicle diagnostic module according to the present invention with a service center according to the present invention in accordance with the method according to the present invention. The components associated with the vehicle are labeled 28 as a whole, while the reference character 20 is assigned to the service center. Service center 20 has associated with it a mobile radio gateway 22 through which data can be exchanged with a plurality of vehicles. Vehicle network 18 can have, for example, a CAN bus to which a plurality of components are connected. Of these components, FIG. 1 depicts a vehicle-specific closed- and/or open-loop control device 10, an embodiment of the vehicle diagnostic module 12 according to the present invention, and a mobile radio gateway 16. Vehicle diagnostic module 12 has an interface 14, for example a CAN bus interface, through which (inter alia) data can be transferred to mobile radio gateway 16 of motor vehicle 28 and thus to service center 20, via mobile radio gateway 22 associated therewith. When a remote diagnosis is to be performed, for example at the driver's request, initiated by vehicle 28, or initiated by service center 20, firstly vehicle identification data (not depicted in FIG. 1) is transferred from vehicle 28 to service center 20. On the basis of the vehicle identification data, service center 20 identifies suitable diagnostic mechanisms and/or diagnostic parameters 26 and transfers them to motor vehicle 28 via mobile radio gateways 16 and 22. These diagnostic mechanisms and/or diagnostic parameters 26 are conveyed to vehicle diagnostic module 12 via its interface 14. Vehicle diagnostic module 12 is equipped with a volatile memory 30 in which the diagnostic mechanisms and/or diagnostic parameters 26 can be temporarily stored. In conjunction with closed-and/or open-loop control device 10, vehicle diagnostic module 12 determines diagnostic data 24 that vary as a function of the particular diagnostic results or test results. The diagnostic data 24 is transferred for evaluation to service center 20, once again via mobile radio gateways 16 and 22.

Service center 20 evaluates diagnostic data 24 and, if applicable, transfers to the vehicle data which influence its operation, for example via the engine control system. If service center 20 diagnoses a serious fault on the basis of diagnostic data 24, the service center 20 may transfer to vehicle 28 data which cause the driver to be informed in suitable fashion as to how he or she should behave, for example "Please stop as soon as possible and shut off engine" or "Please proceed to next service facility," etc. An example of scalable diagnostic results extends, for example, from "You have a malfunction in the engine control system . . . " to "Defective injection valve on cylinder 3, misfire detrimental to catalytic converter detected." The scaling can optionally be performed by the driver, or defined on the basis of a driver database.

The system depicted in FIG. 1 makes it possible to reproduce a very wide variety of interactive diagnostic protocols by reading in and processing procedure descriptions and function descriptions and parameter sets associated therewith, which may be formatted in standardized fashion. Mechanisms for plausibility testing and for starting and terminating the procedure descriptions may also be provided. The possibility thus exists of making available specific and non-time-critical main functions for an individual diagnostic protocol, these main functions being capable of being activated by an external unit. As a result, it is possible for all time-critical diagnostic operations to be externally configured and controlled. A decoupling from an insecure mobile radio channel can, for example, therefore be effected.

The function descriptions or diagnostic mechanisms may encompass at least the following components:
  description of the communication sequence (e.g. master-slave principle with command→response;
  syntax and structure of diagnostic commands;
  syntax and structure of diagnostic data;
  time requirements for the communication procedure (e.g. timeouts for responses from closed- and/or open-loop control device and wait times between commands);
  coding and decoding mechanisms.

The diagnostic parameters required for the particular vehicle models and closed- and/or open-loop control devices may encompass at least the following data structured in standardized fashion:
  identifier for addressing the corresponding closed- and/or open-loop control device;
  structure of the fault memory;
  information for access to the fault memory and its contents;
  test parameters for checking individual components in the closed- and/or open-loop control device; and
  value ranges of diagnostic data.

The method according to the present invention can be implemented, for example, in the form of structured state tables of an automatic device that, by way of its properties and degrees of freedom, can reproduce all known diagnostic protocols (e.g. keyword-XY).

Figure 2:
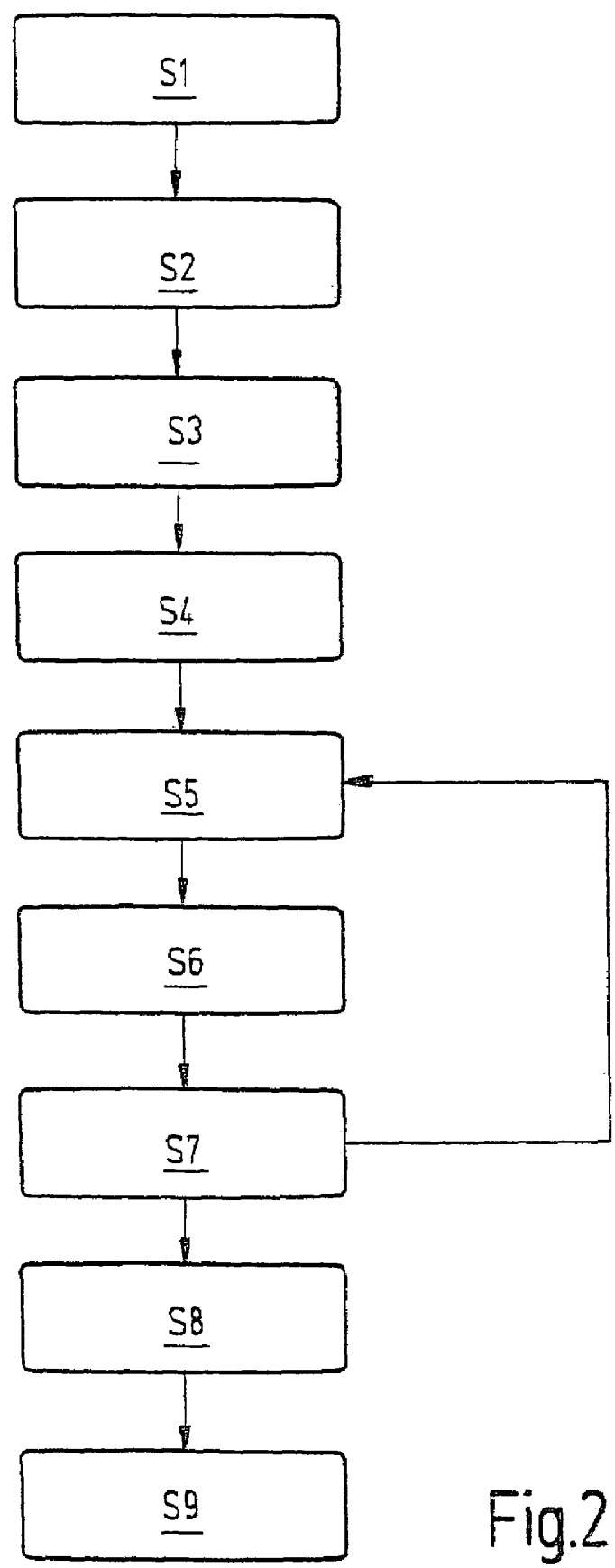
FIG. 2 is a flow chart illustrating an embodiment of the method according to the present invention.

FIG. 2 is a flow chart illustrating an embodiment of the method according to the present invention, the significance of the respective steps S1 through S9 being evident from the following table:

| Step | Description |
| --- | --- |
| S1 | Diagnosis request to service center |
| S2 | Determination of vehicle identification data |
| S3 | Selection of suitable diagnostic mechanisms and parameters |
| S4 | Download of vehicle-specific diagnostic mechanisms and parameters |
| S5 | Transfer of a diagnostic command into the vehicle |
| S6 | Execution of diagnostic command in the vehicle (subprocess) |
| S7 | Transfer of diagnostic data to service center |
| S8 | Identification of fault based on diagnostic data in service center |
| S9 | Transfer of scalable diagnostic results to driver or to vehicle MMI |

In the embodiment of the method according to the present invention depicted in FIG. 2, the driver of the vehicle may wish to perform a remote diagnosis, or intelligent vehicle components may determine that performance of a remote diagnosis is indicated. In step S1, a diagnosis request is therefore sent to a service center, for example to service center 20 depicted in FIG. 1. In step S2, vehicle identification data of the vehicle labeled 28 in FIG. 1 are transferred to the service center labeled 20 in FIG. 1. In step S3, the service center selects, on the basis of the vehicle identification data, suitable diagnostic mechanisms and diagnostic parameters which are labeled with the reference character 26 in FIG. 1. In step S4, the selected diagnostic mechanisms and diagnostic parameters are transferred from the service center to the vehicle, such as via a mobile radio connection. These diagnostic mechanisms and diagnostic parameters are temporarily stored in the vehicle diagnostic module, for example in volatile memory 30 of vehicle diagnostic module 12 depicted in FIG. 1. Once all the diagnostic mechanisms and diagnostic parameters required for performing or at least for initiating the remote diagnosis have been successfully transferred to the vehicle, in step S5, the service center sends a diagnostic command to the vehicle. The transferred diagnostic command, which may be appropriately translated upon transfer onto a vehicle bus, is then executed in the vehicle in step S6; this can correspond to a subprocess. Diagnostic data are thereby obtained, for example the diagnostic data labeled with reference character 24 in FIG. 1, and in step S7, these are transferred to the service center. In the embodiment of the method according to the present invention depicted in FIG. 2, execution can branch once or repeatedly from step S7 back to step S5 by transferring a (further) diagnostic command to the vehicle at that point. Once the requisite diagnostic data have been transferred to the service center, those diagnostic data are evaluated therein in step S8. At step S9, diagnostic results (which may be scalable) are transferred to the driver and/or to corresponding vehicle components. As mentioned, all data transfer between the vehicle and the service center takes place via a mobile radio network.

The method of present invention can also be employed for purposes other than actual diagnosis, for example for the transfer of any data present in the vehicle. Such data can, for example, be read out of memories associated with the vehicle and transferred to respectively suitable service centers.

The description above of the exemplary embodiments according to the present invention is for illustrative purposes only, and not for purposes of limiting the invention. A variety of changes and modifications are possible in the context of the invention without leaving the scope of the invention and its equivalents.

What is claimed is:

1. A method for carrying out a remote diagnosis in a motor vehicle, comprising:
   initializing a remote diagnosis;
   determining diagnostic data in the vehicle as a function of at least one of diagnostic mechanisms and diagnostic parameters available in the vehicle at the time of the determination; and transferring at least a portion of the diagnostic data to an external service center which is configured to evaluate the transferred diagnostic data;
   wherein the at least one of diagnostic mechanisms and diagnostic parameters include test parameters for checking individual components in at least one of a closed-loop and an open-loop control device of the vehicle, the test parameters being transferred from the service center to the vehicle upon the initializing of the remote diagnosis.

2. The method of claim 1, wherein the determination of diagnostic data is performed by a diagnostic module in conjunction with the at least one of a closed-loop and an open-loop control device.

3. The method of claim 1, wherein the step of initialization includes transferring from the vehicle to the service center vehicle identification data, and determining at least one of suitable diagnostic mechanisms and suitable diagnostic parameters based on the identification data.

4. The method of claim 1, further comprising:
   before determining diagnostic data, transferring a diagnostic command from the service center to the vehicle.

5. The method of claim 1, wherein data transfer between the vehicle and the service center is accomplished via a radio connection.

6. The method of claim 5, wherein the radio connection comprises a mobile radio connection.

7. The method of claim 1, wherein at least one of the determination and the transferring is performed repeatedly, depending on the at least one of diagnostic mechanisms and diagnostic parameters being transferred from the external service center.

8. A vehicle diagnostic module for use in carrying out a remote diagnosis in a motor vehicle, comprising:
   an interface for receiving at least one of diagnostic mechanisms and diagnostic parameters at least in part from an external service center upon initialization of the remote diagnosis, wherein the at least one of diagnostic mechanisms and diagnostic parameters include test parameters for checking individual components in at least one of a closed-loop and an open-loop control device of the vehicle, the test parameters being transferred from the service center to the vehicle upon the initialization of the remote diagnosis; and
   a processing unit, which, after initialization of the remote diagnosis, is configured to determine diagnostic data as a function of the at least one of diagnostic mechanisms and diagnostic parameters available in the vehicle at a time of diagnostic data determination;
   wherein the determined diagnostic data are transferred at least in part to the external service center for evaluation.

9. The vehicle diagnostic module of claim 8, wherein the processing unit determines the diagnostic data in conjunction with the at least one of a closed-loop and open-loop control device.

10. The vehicle diagnostic module of claim 8, further comprising:
    a memory capable of storing vehicle identification data;
    wherein the processing unit is configured to authorize a transfer of vehicle identification data to the service center upon initialization of the remote diagnosis, the vehicle identification data being used at the service center to determine at least one of suitable diagnostic mechanisms and suitable diagnostic parameters.

11. The vehicle diagnostic module of claim 8, wherein the processing unit initiates determination of the diagnostic data after a diagnostic command has been received via the interface from the service center.

12. The vehicle diagnostic module of claim 8, wherein the interface is coupled to a radio communication device.

13. The vehicle diagnostic module of claim 12, wherein the radio communication device is a mobile radio device.

14. The vehicle diagnostic module of claim 8, further comprising:
    a volatile memory capable of storing at least one of diagnostic mechanisms and diagnostic parameters received from the external service center.

15. A service center configured to evaluate diagnostic data received from a vehicle via a radio connection for performing a remote diagnosis, comprising:
    an arrangement for determining, on the basis of vehicle identification data received from the vehicle, at least one of suitable diagnostic mechanisms and suitable diagnostic parameters; and
    a radio connection for transmitting the at least one of suitable diagnostic mechanisms and suitable diagnostic parameters to the vehicle;
    wherein the at least one of diagnostic mechanisms and diagnostic parameters include test parameters for checking individual components in at least one of a closed-loop and an open-loop control device of the vehicle, the test parameters being transferred from the service center to the vehicle upon initialization of the remote diagnosis; and
    wherein the at least one of diagnostic mechanisms and diagnostic parameters are used in the vehicle for determination of the diagnostic data.

16. The service center of claim 15, wherein the radio connection includes a mobile radio connection.

17. The service center of claim 15, wherein the service center is mobile.

* * * * *